United States Patent [19]

Warszawski

[11] 4,160,856

[45] Jul. 10, 1979

[54] NOVEL FUEL CELL CONTAINING NOVEL MEANS FOR REMOVAL OF CARBONATES

[75] Inventor: Bernard Warszawski, Paris, France

[73] Assignee: Societe Generale de Constructions Electriques et Mecaniques"Alsthom et Cie, Paris, France

[21] Appl. No.: 751,213

[22] Filed: Dec. 16, 1976

Related U.S. Application Data

[62] Division of Ser. No. 541,996, Jan. 17, 1975, Pat. No. 4,002,493.

[30] Foreign Application Priority Data

Jan. 25, 1974 [FR] France .................. 74 02516

[51] Int. Cl.² ............................................. H01M 8/06
[52] U.S. Cl. ........................................ 429/14; 429/34
[58] Field of Search ................ 429/14, 34, 17, 46, 429/40, 13

[56] References Cited

U.S. PATENT DOCUMENTS

| | | | |
|---|---|---|---|
| 3,511,712 | 5/1970 | Giner | 429/14 |
| 3,703,416 | 11/1972 | Jacquelin | 429/34 |
| 3,925,099 | 12/1975 | Bono | 429/14 |

Primary Examiner—Anthony Skapars
Attorney, Agent, or Firm—Frishauf, Holtz, Goodman & Woodward

[57] ABSTRACT

This invention provides a multi-compartment fuel cell wherein each cell has an anode and a cathode separated by a membrane partly immersed in the electrolyte and contains means for the progressive removal of carbonates formed during operation of the fuel cell.

26 Claims, 21 Drawing Figures

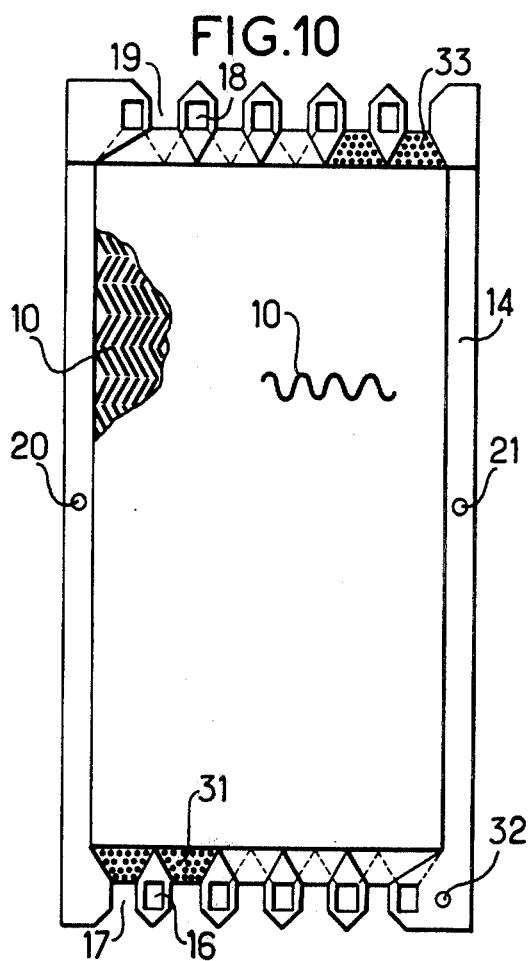
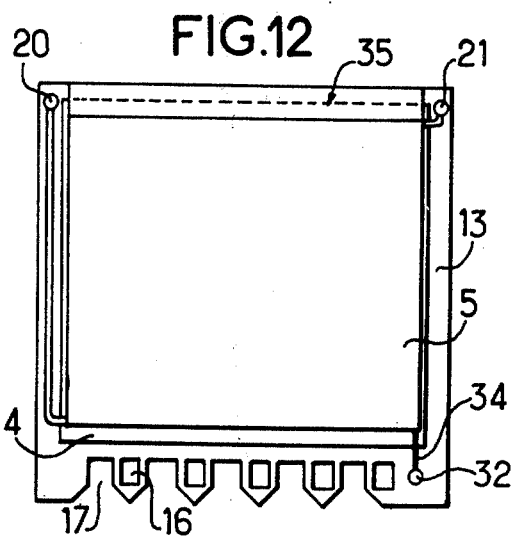
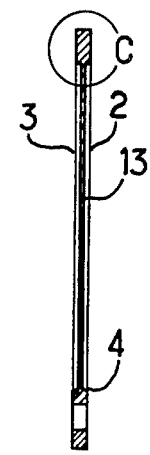
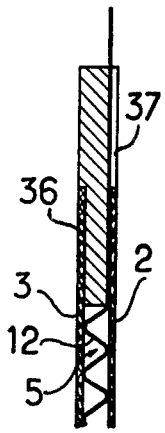

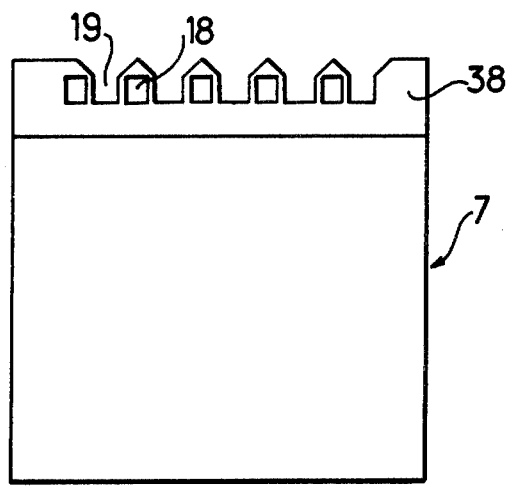
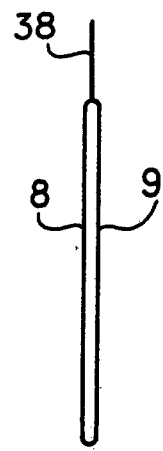
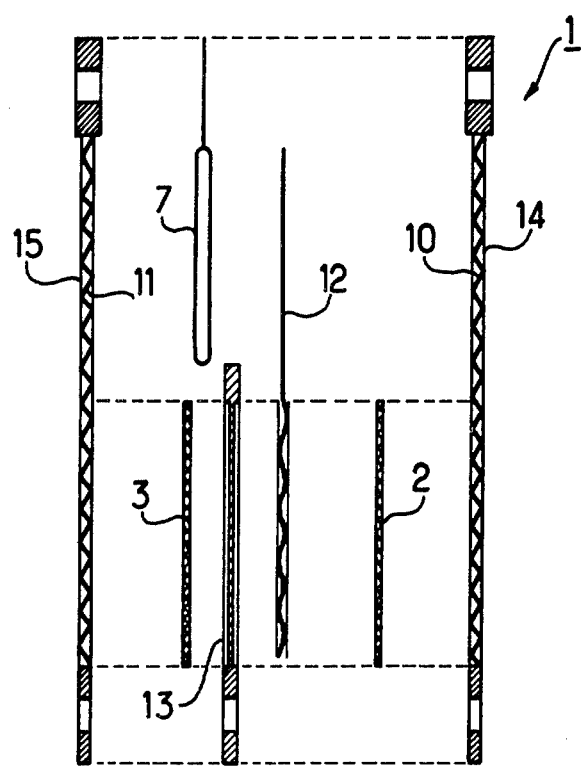

NOVEL FUEL CELL CONTAINING NOVEL MEANS FOR REMOVAL OF CARBONATES

This is a division of application Ser. No. 541,996, filed Jan. 17, 1975, now U.S. Pat. No. 4,002,493, issued Jan. 11, 1977.

The present invention concerns a new structure of fuel cell in which a gaseous fuel and a gaseous combustive or brought to the gaseous state are brought into action, as well as a new system for connecting the fuel cell with auxiliary elements to form an autonomous battery assembly.

Fuel cells are known and more particularly cells of the type called "filter press" fuel cells, which are constituted by several elements fixed to one another by any appropriate means, each of these elements comprising an anode and a cathode separated from each other by a separator, current collectors ensuring electrical continuity with the neighbouring elements. The anode and the cathode are irrigated by currents of reactive liquids comprising respectively the electrolyte and the fuel and the electrolyte and the combustive.

Such cells have been described, for example, in French patents and patent applications Nos. 1 522 304, 1 522 305, 1 522 306 filed on Feb. 24, 1967, 1 584 577 filed on July 3, 1968. Said French Pat. No. 1,522,305 corresponds to U.S. Pat. No. 3,516,866 issued June 23, 1970, and said French Pat. No. 1,522,306 corresponds to U.S. Pat. No. 3,530,003 issued Sept. 22, 1970.

These structures have been designed for diluted reagents and electrolytes conjugated at temperatures which are generally moderate, capable, in these conditions, of providing densities of current (at acceptable polarizations) of a few tens of mA/squ. cm. at least. These structures have proved to be perfectly suited in particular to reagents such as hydrazine, hydrogen peroxide, atmospheric air, etc. and have given rise to the manufacturing of electrochemical cells having high performances, characterized, more particularly by their density of power in the order of a kilowatt per cubic decimeter.

Nevertheless, it appeared, during experiments, that such structures are not very suitable for the use of concentrated reagents and electrolytes conjugated at high operating temperatures and having numerous disadvantages when such concentrations and high temperatures are necessary for obtaining acceptable densities of current, as is the case with a fuel such as methanol, which is a particularly interesting fuel when combined with a combustive such as air.

A first disadvantage is considerable evaporation of methanol by the air crossing the cell, hence a major reduction in the efficiency.

A second disadvantage is the loss of energy by shunting by the electrolyte common to all the elements of the same battery, hence a further reduction in the efficiency.

Another disadvantage is the proportion of the losses of head of the air making the use of a compressor compulsory, whose power consumption, bulk, cost and noise greatly reduce the efficiency, the density of power, the cost price and the applications of the cell.

Another disadvantage results from the fact that with methanol and more generally with any carbonated fuel requiring the use of the decarbonatation cycle described in French Pat. No. 1 522 309 (which corresponds to U.S. Pat. No. 3,511,713 issued May 12, 1970) to expel the carbon dioxide given off, the aforementioned high concentrations disturb the operation of that cycle, which is designed for slight concentrations and cause a reduction in the efficiency and an overdimensioning of the cell.

Another disadvantage results from the fact that the duration of the service life of the cell is appreciably affected by degradation processes arising from a too great mutual interaction of the components, electrolytes and reagents.

Another characteristic of these cell structures is that they must, to constitute a complete autonomous cell, be connected with a great number of auxiliary elements (such as a radiator, a cooling fan, a chemical air compressor, an evaporated methanol scavenger, a precondenser of evaporated water, electrolyte flow pumps, injection pumps, concentration probes, electronic regulating circuitry, etc.), which are voluminous, complex and expensive, this affecting, more particularly, the density of power, the reliability, the maintenance costs and the price of the assembly.

The present invention, which makes it possible to overcome the major disadvantages previously mentioned has as its first object a new structure for a fuel cell in which gaseous reagents or reagents brought to the gaseous state are used, the fuel, more particularly, possibly being carbonated or otherwise.

Such a structure has the following major advantages;

The elements can be connected together in a great number in a same battery by simple repetitive stacking of the filter press type of an elementary sequence of a few thin elementary components, the stacking determining automatically the putting into series of the elements, these components comprising suitable openings and reliefs whose co-operation within the stacking determines the networks of feed and exhaust ducts for the fuel and the combustive and for the inserting and removal of the electrolyte, the total thickness of an element within the battery being in the order of a millimeter.

During the operation periods, the electrolyte contained in each element is not in continuity with the electrolyte contained in each other element, this avoiding any shunting by the common electrolyte and allowing, without any inconvenience, the use of concentrated electrolytes and of high operation temperatures;

The anode and the cathode are separated by an electrolytic space without convection, whose thickness (in the order of 5/10mm) is sufficient for the diffusion of a fuel such as methanol through that space between the anode and the cathode to cause a spurious evaporation in the air crossing the cathode compartment, of less than 10% of the methanol consumed;

Each element comprises a structurally integrated exchanger-condenser which co-operates with the electrochemical part of the element, ensuring the cooling of the latter by evaporation of electrolytic water in the air crossing the cell, then the return of that water, after recondensation, by natural processes, without pumping means;

The paths of chemical air and of cooling air have a minimum length, and a maximum cross-section without any bottlenecks or elbows, affording a total loss of head in the order of a few millimeters of water, this enabling the chemical air and the cooling air to be made to flow by means of a cheap low-pressure ventilation system and dispensing with the necessity of a compressor.

The present invention has as another object a new decarbonatation method for a base electrolyte, which may be implemented in the present new cell structure in the case of the consumption of a carbonated fuel and characterized by the combination of the associating with the anode of a fixing agent such as a resin of carbonate ions and of the use of means enabling two different states to be imparted to the electrolyte.

The present invention has as another object a complete fuel cell system comprising a very small number of auxiliary elements and thus affording a maximum of density of power and of reliability, with a minimum cost price.

The invention therefore concerns a fuel cell of the type constituted by several elements arranged in electrical contact with one another, each element comprising;

Two electrodes, a cathode and an anode each comprising a specific catalyst;

An electrolyte filling the gap situated between the said electrodes and constituted by an aqueous solution, preferably alkaline, in which the electrodes are immersed;

A separating membrane containing the electrolyte, arranged within the said electrolyte between the electrodes;

Two corrugated bipolar current collectors, a first collector called the cathode collector, bearing, by the tops of its cathode face, against the outer surface of the said cathode and, by its anode face, against the outer surface of the anode of an adjacent element and a second collector called the anode collector, bearing, by the tops of its anode face, against the outer surface of the said anode and by its cathode face against the cathode of the other adjacent elements, a combustive gas flowing between the said cathode and the said cathode collector and a gaseous fuel flowing between the said anode and the said anode collector, the two fluids flowing in parallel movements and in the same direction, preferably in the vertical direction, from top to bottom; characterized in that the said element comprised, moreover;

Means suitable for condensing the water drawn off in the form of steam by the said combustive;

Means capable of making the condensed water flow back towards the electrolyte;

Means capable of ensuring, "in situ" the progressive removal of the carbonates formed during the reactional process with the said electrolyte;

And means suitable for removing the said carbonates in the form of carbon gas.

According to one characteristic of the invention, the electrolyte is constituted preferably by an aqueous solution which may be a base, neutral or acid solution, the electrodes being immersed in that electrolyte, the electrolyte being enclosed in a frame made of plastic material cooperating with the electrodes to form a recess and being able to extend itself by a full part up to the lower periphery of the collectors.

According to another characteristic of the invention, the membrane containing the electrolyte by capillarity is corrugated in periodic pattern so as to be in contact by the tops of the corrugations with one electrode and the other.

According to another characteristic of the invention, the collectors are formed by a metallic or plastic conductive sheet having a thickness of a few tens of microns, corrugated so as to have an overall thickness in the order of 500 microns, in a periodic pattern which may be preferably the type called "herring-bone corrugated" pattern, the average direction of the splines being vertical.

The said herring-bone corrugation pattern may be preferably made assymetrical, the grooves on the cathode side having a greater cross-section than those on the anode side so as to reduce the losses of head of the air.

According th another characteristic of the invention, the collectors are extended vertically above the electrochemical zone of the element by a length in the same order and are separated in that second zone by a passage having walls which are a few tenths of a micron thick, preferably made of a plastic material, the said passage, having a horizontal direction, being open at both its ends and possibly having one of its walls extended to the upper peripheral zone of the collectors so as to separate them in the said zone.

The said collectors are surface moulded on their periphery by means of a plastic insulating material, the lower and outer periphery comprising openings to form interlocking feed (or outlet) ducts respectively for the combustive gas end for the fuel, the ducts of a same type communicating by a same face of the component with the corresponding gaseous compartment through microducts or through a zone of projections, the atmospheric air ducts being preferably wider than those for the fuel and preferably open so as to enable the letting in and letting out of the atmospheric air through an outlet having a wide cross-section and without any change in direction, the collectors comprising, moreover, other openings and reliefs forming ducts and microducts for letting the electrolyte into the electrolyte compartments and for removing it therefrom as well as for draining these latter and, possibly, openings for passing braces enabling the clamping of the battery between the clamping plates.

According to another characteristic of the invention, the total thickness of the components of an element is substantially identical at all points of the element, that thickness being, however, a little greater in the zone of the electrodes than at the moulded surface of the periphery, so as to obtain, after clamping, a pressure ensuring good electrical contact between each electrode and the corresponding collector.

Moreover, according to the invention, the membrane, having a thickness in the order of a few tens to a few hundreds of microns, is corrugated in the zone of the electrodes, preferably with the same pattern and in the same average vertical direction as the collectors; it is extended by a plane part, continuous or built up, in the upper zone where it is inserted between the plastic passage and the cathode collector.

Moreover, according to the invention, a fixing agent for carbonate ions and more particularly an ion exchange resin is connected with or mixed with the anode.

Furthermore, means for the periodic insertion and removal of the electrolyte simultaneously in a same group of compartments of the battery are possibly connected with the cell.

Moreover, the battery can possibly be subdivided into polyelements electrically connected up in parallel and coated with a resin over all its periphery, with the exception of the chemical air and cooling air inlet and outlet ears.

A cell in which the methanol and air are used, the electrolyte being a potassium hydroxide solution, it being understood that other carbonated or non-carbonated fuels, neutral or acid combustive agents and electrolytes may also be used without forasmuch going beyond the scope of the invention, will be described hereinbelow by way of a purely illustrating example of embodiment having no limiting character.

The following description will be given with reference to the accompanying drawings and diagrams, in which:

FIG. 10 shows a corrugated collector and its surface moulding implemented in the element of the new cell structure according to the invention;

FIG. 11 shows a substantially middle cutaway view of the said corrugated collector and its surface moulding;

FIG. 12 shows the fixing frame for the electrodes implemented in the element of the new cell structure according to the invention;

FIG. 13 shows the said frame substantially in a middle cutaway view;

FIG. 14 shows, on a large scale, the portion C of FIG. 13;

FIG. 15 shows an elevation view of the condenser exchange implemented in the element of the new cell structure according to the invention;

FIG. 16 shows a side view of FIG. 15;

FIG. 17 illustrates the relative position of the various components of an element of the new cell structure according to the invention;

Figure 1:
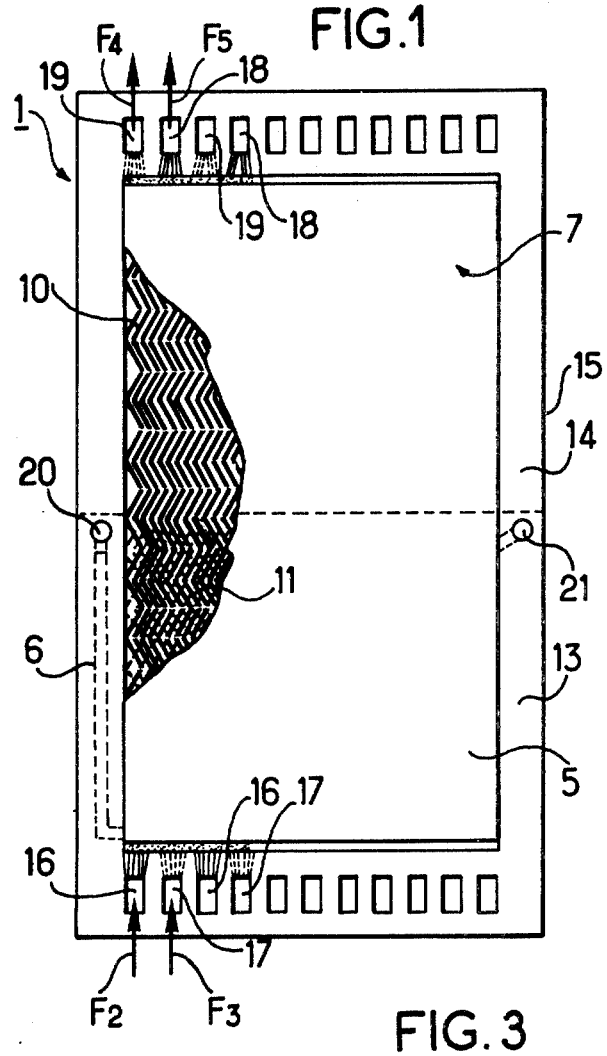
FIG. 1 shows an elevation view of an element of the new cell structure according to the invention.
Figure 2:
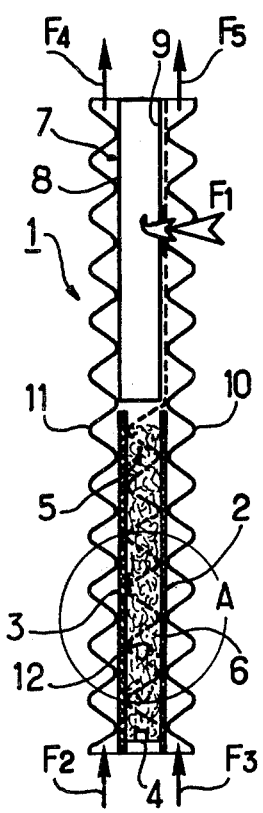
FIG. 2 shows partly a substantially middle cutaway view of the said element.

FIGS. 1 and 2 show an element, referenced 1 as a whole, of the new fuel cell structure according to the invention, such a cell being of the filter-press type and consequently comprising several elements identical to the element 1, fixed to one another by clamping, as will subsequently be illustrated.

The said element 1 comprises a cathode 2 and an anode 3 defining, with a bottom 4, an electrolyte compartment 5 containing the electrolyte 6, such components being shown more particularly in FIG. 2.

Above the electrolyte compartment 5, there is an exchanger-condenser 7 consisting of two walls 8 and 9 between which an air flow shown substantially by the arrow F1, circulates. The element 1 comprises, moreover, two metallic current collectors, a cathode collector 10 and an anode collector 11, ensuring moreover, electrical continuity with the neighbouring elements of the cell.

As shown in FIGS. 1 and 2, the collectors are corrugated and have grooves and ridges in a generally vertical direction. With reference more particularly to FIG. 2, it will be seen, moreover, that a porous separating membrane 12 containing liquid is arranged in the electrolytic compartment 5 between the electrodes 2 and 3. Moreover, such a membrane extends to the upper part of the element 1 where it is arranged between the wall 9 of the exchanger-condenser 8 and the cathode collector 10. FIG. 2 shows clearly that the said membrane 12 has a corrugated shape inside the electrolytic compartment and that it comes into contact through such a corrugated profile with the surface of the electrodes 2 and 3, alternately, such an arrangement appearing clearly with reference to FIG. 3.

On referring again to FIG. 1, it should be noted that the assembly formed by the two electrodes 2 and 3, the collector 10 and the collector 11 are fixed in frames or surface mouldings of plastic material 13, 14 and 15 respectively, whose relative arrangement does not appear on the said figure, but which will be described hereinbelow.

Moreover, the supply of methanol vapour and air have been shown respectively by the arrows F2 and F3, the removal of the carbon dioxide and of the air deleted of oxygen themselves being illustrated by the arrows F4 and F5.

FIG. 1 shows that the supply of methanol and air is ensured by means of ducts 16 and 17 respectively, the removal of the gases resulting from the reaction which is effected by means of ducts 18 and 19.

Lastly, ducts 20 and 21 ensuring the filling or removal of the electrolyte 6 in its compartment 5, as will be described elsewhere, have been shown.

Figure 3:
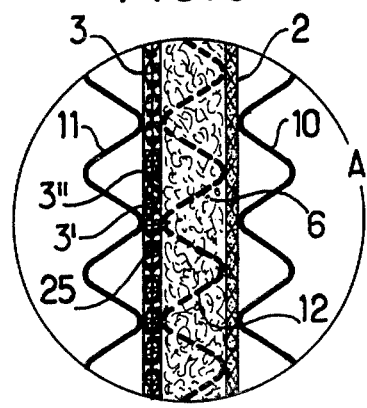
FIG. 3 shows, on a large scale, a portion A of FIG. 2.

With reference more particularly to FIG. 3, the cathode 2 is constituted by a layer of catalyst such as carbon and by a binding agent such as polytetrafluoroethylene and by carbon fibers, shown very diagrammatically at 25. Such fibers which have been inserted in the paste used for preparing the cathode layer have a slight length and are spaced out along an average longitudinal direction; they ensure, on the one hand, the cohesion of the cathode and, on the other hand, a high longitudinal conductivity, while improving the contact between the cathode 2 and the collector 10.

Inasmuch as concerns the anode 3, such an electrode is constituted by two layers, a first layer 3' constituted by active carbon suitably catalysed, for example by means of platinum group metal and by a binding agent as well as by a certain proportion of a water repellent resin such as polytetrafluorethylene, and a second layer 3" formed by a $CO_3^{2-}$ ion fixing agent which may be an resin for exchanging ions which is highly basic, or an insoluble hydroxide powder forming an insoluble carbonate, such as calcium hydroxyde.

To great advantage, carbon fibers 25 like those of the cathode are also scattered in the anode layer; it will be observed however that in the case of the anode, the fixing agent, the resin or the hydroxide may be closely mixed with the catalyst, the said anode then being in the form of a single layer.

As for the electrolyte 6 filling the compartments 5, it is constituted by a solution of potassium hydroxide 1 to 2N; also a salt such as, for example, potassium chloride, potassium sulphate, etc., in a concentration which may range up to several M/liter, aiming at improving the conductivity, reducing the transport number of the OH— ions during the decarbonatation phase and supplying anions for neutralizing the resin or the hydroxide, when eliminating the fixed $CO_3=$. The electrolyte comprises, moreover, pH buffer whose concentration, which is not critical, may be slight (in the order of a few 1/10 of a M/liter) and whose pK will preferably be close to the pH at which $CO_2$ is given off, that buffer may be, for example, the borateboric acid buffer, monoacid phosphate-diacide phosphate, acetic acid-acetate buffer, etc.

FIGS. 1 to 3 show the electrolytic compartment filled with electrolyte 6.

Figure 4:
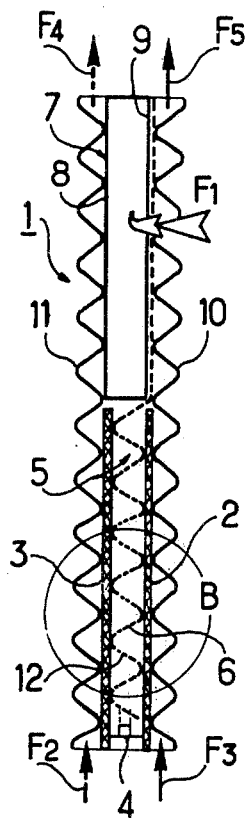
FIG. 4 shows a substantially middle cutaway view of the said element after the removal of the electrolyte.
Figure 5:
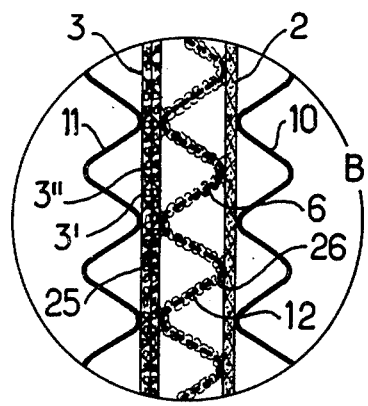
FIG. 5 shows a large scale view of a portion B of FIG. 3.

FIGS. 4 and 5 show the said compartment 5 after removal of the electrolyte, such an operation representing a phase of the functional process as will be explained elsewhere.

FIG. 5 shows more particularly that after such draining, the porous membrane 12 retains the electrolyte 6 and, moreover, that meniscuses of electrolyte such as 26 are formed at the points of contact between the said membrane and the electrodes; the result of this is that an uninterrupted continuity is thus ensured between the electrodes 2 and 3.

Figure 6:
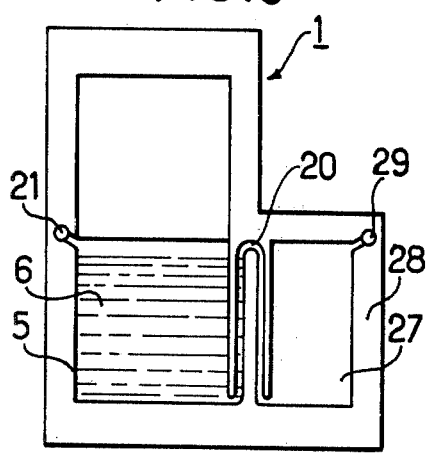
FIG. 6 shows diagrammatically a first embodiment of the electrolyte permutation system according to the invention.

On referring now to FIG. 6, it will be seen that the electrolyte 6 of the compartment 5 of the element 1 may be transferred in a tank 27 which may be arranged in a surface moulding 28 provided in the outer frame of the cell, such a transfer being effected through a duct in the shape of a syphon 20 (FIG. 1) and under the influence of a low pressure set up through the duct 29 by means of a pump.

Conversely, the electrolyte 6 may again be transferred to the compartment 5 by a low pressure set up through the duct 21 (FIG. 1).

Figure 7:
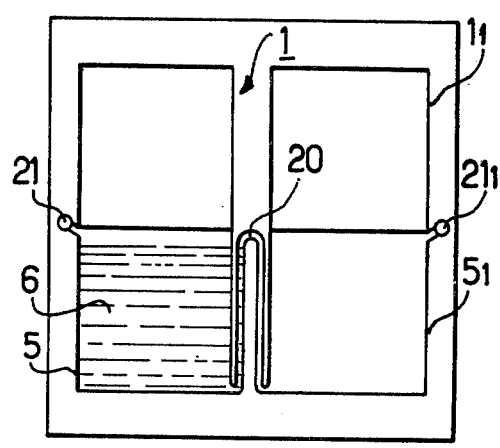
FIG. 7 shows diagrammatically a second embodiment of the electrolyte permutation system according to the invention.

FIG. 7 shows a second embodiment of such operation for moving the electrolyte 6. In that case, the electrolyte 6 in the compartment 5 of the element 1 of a first cell may be transferred by a process similar to that previously described in the compartment $5_1$ of an element $1_1$ of a second cell operating in parallel with the first and vice versa, the low pressure being set up through the ducts 21 and $21_1$ as the cas may be.

Figure 8:
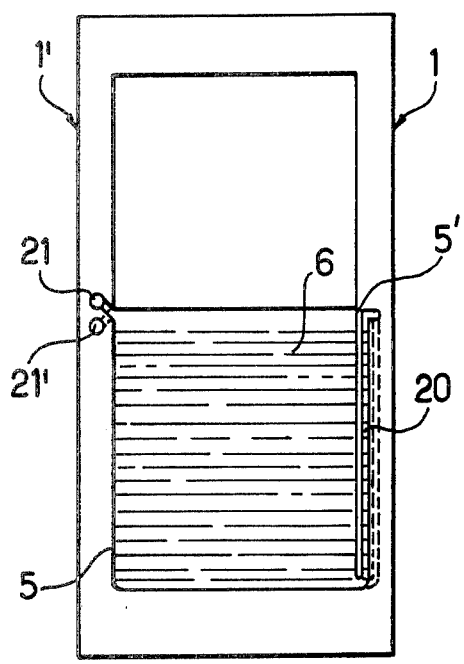
FIG. 8 and FIG. 9 show diagrammatically a third embodiment of the electrolyte permutation system accordint to the invention.
Figure 9:
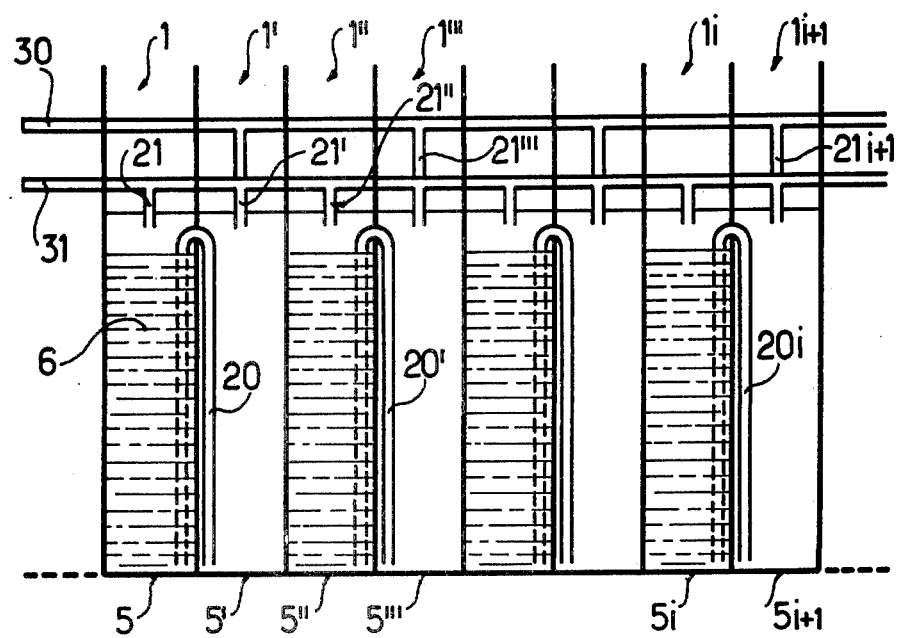

In a third embodiment illustrated in FIGS. 8 and 9, each element of the cell is connected with a neighbouring element of the same cell. Thus, the compartment 5 of the element 1 communicates with the compartment 5' of the element 1', the compartment 5" of the element 1" communicates with the compartment 5''' of the element 1''' by means of the syphon d cts 20 and 20' respectively. The compartment 5a of the element 1a communicates with the compartment $5i + 1$ of the element $1i + 1$ by means of the duct 20i and so on. It will also be seen in FIG. 9 that the compartments 5, 5' 5" . . . $5i + 1$ are provided with ducts 21, 21', 21", $21i + 1$ fed by the passages 30 and 31 which may alternately put into communication with the low pressure pump so as to convey the electrolyte ϵ from one compartment to the other and vice versa.

FIG. 10 and FIG. 11 show the structure of the corrugated collectors 10 or 11 (FIG. 1) used in the element 1 of the cell, for example of the cathode collector 10, the structure of the anode collector 11 being substantially equivalent.

The collector 10 is therefore fixed in the surface moulding or frame 14 made of plastic material comprising the ducts 20 and 21 for the movement of the electrolyte (FIG. 1) as well as a duct 32 whose function will be explained elsewhere. The lower part of the surface moulding comprises the openings 16 and 17 for supplying methanol and air respectively, the ducts 17 having their lower part flared to form an inlet ear having a large cross-section, whereas the upper part is provided with ducts 18 and 19 for the removal of the gases resulting from the reaction. It will be observed that the distribution and the removal of these liquid gases is effected by means of a field of protuberances 31, 33 aiming at ensuring a good distribution of the fluids on the surface of the electrodes while reducing to a minimum the losses of head.

It will also be observed that the air inlet ducts 17 and air outlet ducts 19 are open, so as to reduce to the maximum possible extent the losses of head of the air, by making it avoid the path of ducts having a small cross-section and a great length having, moreover, elbows; it will likewise be observed that with the same aim in view, the air ducts are are wider than the methanol ducts.

It will be observed, moreover, that the corrugation of the collector 10 have an assymetrical shape as shown, this being to reduce to a minimum the losses of head pressure of the air feeding the cell, whereas the corrugation of the collector 11 are substantially smaller, with a view to promoting the maximum exhaustion of the methanol in contact with the anode.

FIGS. 12 and 13 show the frame 13 for the fixing of the electrodes 2 and 3. The frame 13 is hollowed out and defines the electrolytic compartment 5 with the electrodes and its bottom 4. It comprises, of course, the methanol and air feed ducts 16 and 17, the ducts 17 having their flared lower part forming an inlet ear having a wide cross-section, the ducts 20 and 21 for the periodic removal and return of the electrolyte, as well as the duct 32 (FIG. 10) intended for equalizing the level between the electrolytic compartments of the elements of the cell; such a duct 32 is therefore connected to each of the compartments 5 through a microduct 34 which, because of its very slight diameter, brings about only negligible losses by shunting.

FIG. 14 shows on a larger scale the upper part 35 of the said frame 13 in which two recesses 36 and 37 have been formed, the recess 36 accomodating the anode 3, whereas the recess 37, having a greater surface, fixes the cathode 2 and the beginning of the plane part of the separating membrane 12 before application between the wall 9 of the condenser-exchanger 7 (FIG. 1).

FIGS. 15 and 16 show the exchanger-condenser 7 described with reference to FIG. 1 and formed by the two thin walls 8 and 9 between which the cooling air flows, the upper part 38 having the ducts 18 and 19 for the removal of the carbon dioxide resulting from the combustion of the methanol and of the air depleted in oxygen respectively running through it.

FIG. 17 which shows an exploded view of the element 1, illustrates the relative position of the components of the said element. Therefore, from left to right, the figure shows successively the anode collector 11 and its surface moulding 15, the anode 3, the exchanger-condenser 7, the fixing frame 13 for the electrodes, the separating membrane 12, the cathode 2 and lastly, the cathode collector 10 and its surface moulding 14.

Figure 18:
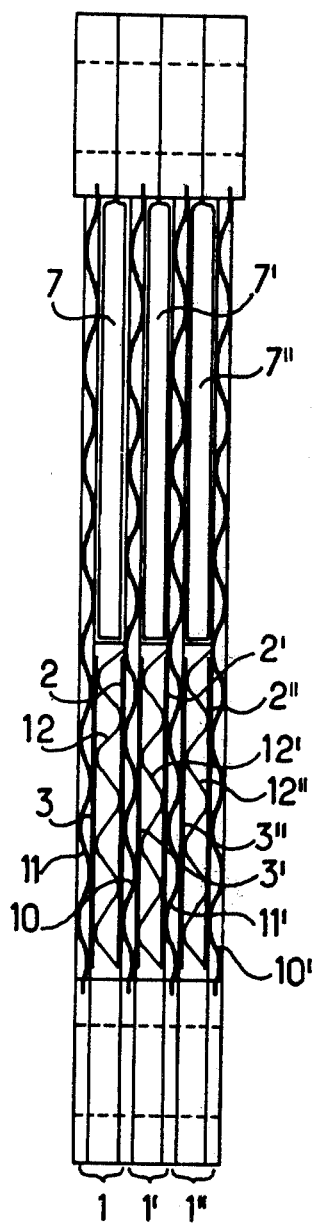
FIG. 18 shows a first method of relative arrangement of the components of the elements of the new cell structure according to the invention.

FIG. 18 shows a first embodiment of arrangement of the elements of the cell. The said figure therefore shows 3 elements 1, 1' and 1" as well as their main components, namely, the cathodes 2, 2', 2'', the anodes 3, 3', 3'', the separating membranes 12, 12', 12'', the anode collectors 11 and 11' and the cathode collectors 10 and 10', each of the said collectors being, of course, common to two elements and lastly the exchanger-condensers 7, 7' and 7''.

As shown in the figure, such an arrangement is of the symmetrical type, that is, an exchanger-condenser is connected with each element, the membranes 12, 12', 12'' bearing against one of the walls of each of the said condenser.

Figure 19:
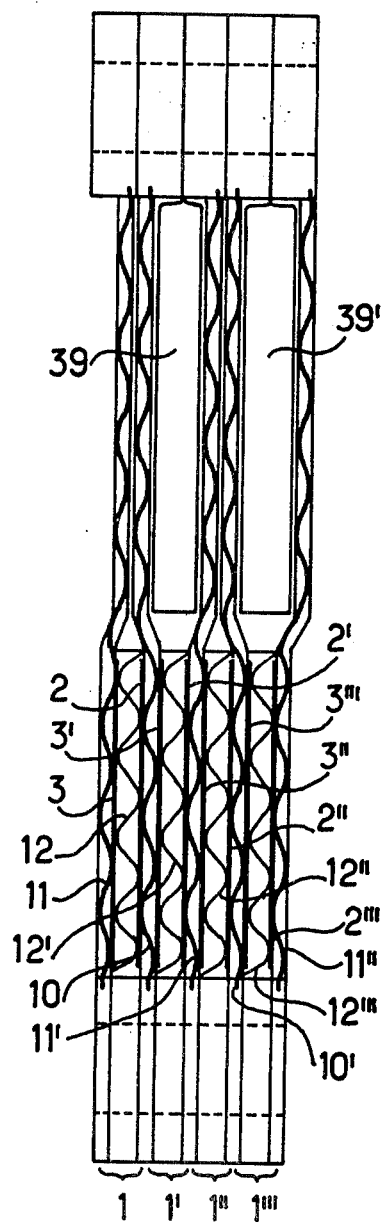
FIG. 19 shows a second method of relative arrangement of the components of the elements of the new cell structure according to the invention.

FIG. 19 shows a second embodiment of arrangement in that dissymetrical case, in which four elements 1, 1', 1'' and 1''' of the cell comprising their main components, namely, the cathodes 2, 2', 2'', 2''', the anodes 3, 3', 3'', 3''', the separaging membranes 12, 12', 12'', 12''', the collectors 11, 11', 11'', 10, 10', as well as two exchanger-condenser 39 and 39', have been shown. It will be observed that in this embodiment, one of the faces of each condenser-exchanger is in direct contact with the separating membrane of an element whereas the other face is in contact with the separating membrane of the neighbouring element through the anode collector of the said element.

It will be observed, moreover, that the condenser-exchanger 39 and 39' have a cross-section substantially equal to twice the cross-section of the condenser-exchangers shown in FIG. 18. Such an embodiment therefore makes it possible to reduce the losses of head of the cooling air to a minimum value, the losses in the capillary spaces varying like the reverse of the cube of the capillary dimension.

Figure 20:
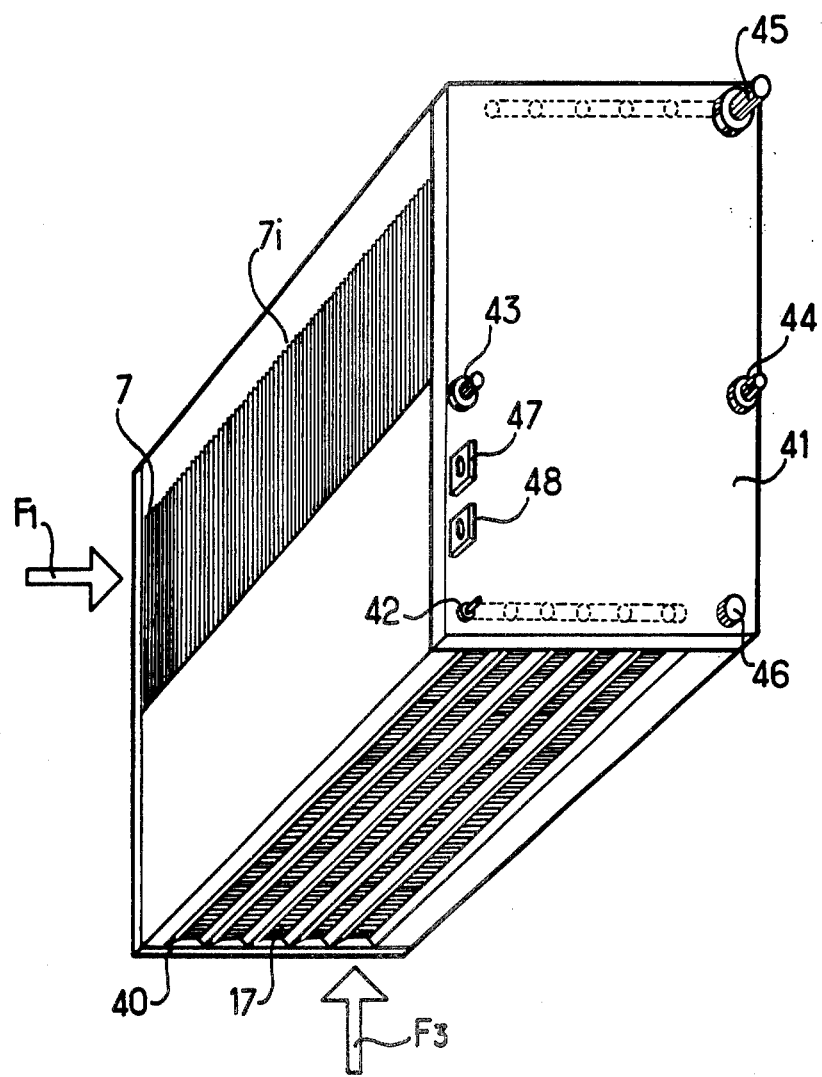
FIG. 20 shows in perspective an overall outside view of an embodiment of a cell according to the invention.

FIG. 20 shows a perspective outside view of a practical embodiment of a cell according to the invention. Such a cell therefore comprises several elements 1 clamped against one another (not shown in the figure), such clamping being ensured by means of the end plates 40 and 41. Nevertheless, the openings of the exchanger-condensers 7 . . . 7i receiving the cooling air materially shown by the arrow F1 (FIG. 1) as well as the flared lower part or ears, having a large cross-section, of the ducts 17 for feeding air materially shown by the arrow F3, may be distinguished in the said FIG. 20. The plate 41 comprises successively an injector 42 for supplying methanol leading out at the ends of the ducts 16 (FIG. 1), two nozzles 43 and 44 connecting the channels 30 and 31 used for the movement of the electrolyte (FIG. 9) to a low pressure pump, a nozzle 45 in communication with the orifices 18 and 19 (FIG. 1) conveying the carbon dioxide and the residual air after the reaction in the cell and lastly a stopper 46 stopping up the channel or duct 32 and enabling the draining of the electrolyte from the cell. Moreover, two output terminals 47 and 48 ensure the conveying of the current generated in the cell towards the load. Such a cell may be coated with a resin, in such a way that, of course, the air may enter and leave freely.

Figure 21:
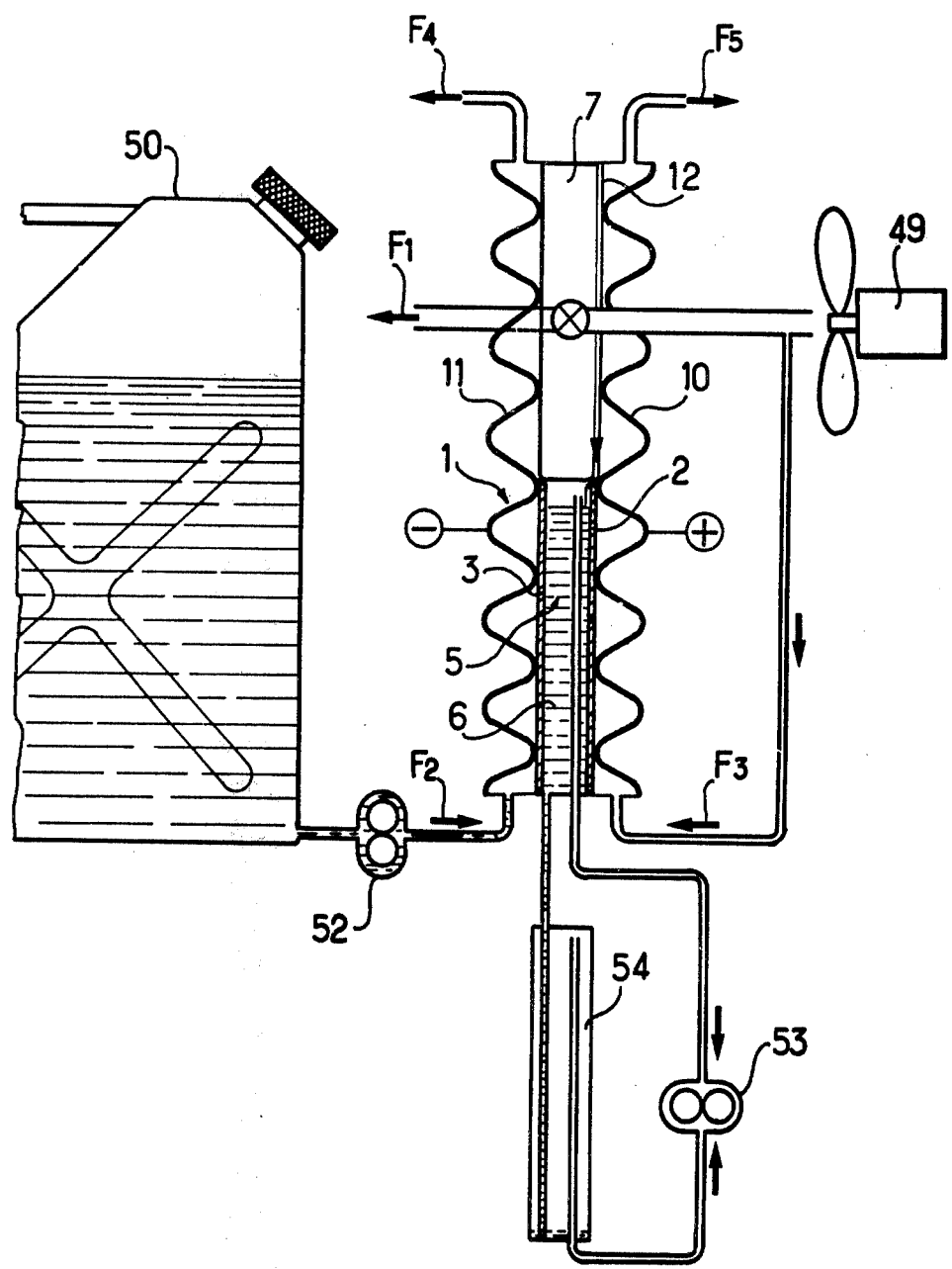
FIG. 21 shows very diagrammatically the operation of a cell according to the invention.

FIG. 21 shows diagrammatically in a very general way the operation of the cell according to the invention.

In that figure, the element 1 and its main components described hereinabove have been diagrammatically shown. Moreover, that figure shows a fan 49 ensuring on the one hand the flow of cooling air as shown by the arrow F1 towards the condenser-exchanger 7 and on the other hand the combustive air flow towards the cathode 2 as shown by the arrow F3, the gases resulting from the reaction being removed as shown by the arrows F4 and F5.

Moreover, a methanol tank 50 and a first pump 52 ensuring the feeding of the cell with such a fuel and on the other hand a second pump 53, which is a low pressure pump suitable for effecting the removal of the electrolyte 6 from the compartment 5 towards a tank or another compartment of the cell such as described in FIGS. 6, 7 and 8 and referenced here by the index 54.

Having, in the preceding text, described the structure of the cell according to the present invention, the operation of such an electrochemical cell, whose other advantages will also be set forth, will now be disclosed with reference to the preceding description.

Such operation comprises two main phases, namely an active phase and an electrolyte decarbonation.

Inasmuch as concerns, in the first place, the active phase, the cell is fed, therefore, with methanol by means of the pump 52 (FIG. 21) through the injector 42 (FIG. 20). The fuel is vapourized instantaneously, the temperature prevailing within the cell being in the order of 75° C. Of course, at the starting up, a heating resistor known per se could be provided at the inlet of the cell, to vapourize the methanol, until the temperature of the cell reaches the operation temperature. The methanol vapours are therefore conveyed through the ducts 16 (FIG. 1) towards the various elements such as 1 of the cell and rise along the anode as shown by the arrow F2, producing, by oxydisation on the anode, $CO_3^{2-}$ ions more particularly which carbonate the said electrolyte, potassium hydroxide in this instance. The residual vapours of methanol, which are, moreover, in very slight quantity, rise in the upper part of the element where their saturating vapour pressure becomes less than the atmospheric pressure, so that they do not leave the element and are not lost.

The $CO_3^{2-}$ ions formed are then trapped by the layer of the fixing agent 3'' of the anode 3, the said fixing agent which was originally in the form $OH^-$ therefore changing to the form $CO_3^{2-}$. On the cathode side, the cell is fed with air by means of the fan 49 (FIG. 21) ensuring also the feeding with cooling air of the condenser-exchanger 7 as shown by the arrow F1. The combustive air conveyed through the ducts 17 therefore rises along the cathode as shown by the arrow F3 and its oxygen generates, with the electrolyte, $OH^-$ ions; the residual air is therefore removed through the ducts 19 towards the outside as shown by the arrow F5.

While the air is being conveyed along the cathode 2, it becomes depleted in oxygen and becomes saturated with water vapour because of the temperature prevailing in the cell. Coming into contact with the wall 9 of the condenser-exchanger 7 (FIG. 1), the water vapour is condensed and is trapped by the planar portion of the separating membrane 12 which makes it flow back towards the electrolyte 6 of the compartment 5. Such an active phase of the operation of the cell is continued until virtually all the fixing agent 3'' is converted to the form $CO_3^{2-}$.

It will be observed that in such an active phase, the electrolyte does not flow, this making it possible, on the one hand, to obtain an even reaction throughout the whole surface of the electrodes and, on the other hand, the cancelling of the losses by shunting, the communication between the compartments of the elements of the cell being ensured only by the microduct 34 for the equalizing of the levels (FIG. 12). There are therefore no limits, inasmuch as concerns the composition of the electrolyte and therefore it is impossible, in this respect, to obtain the most favourable conditions.

It will also be observed that the implementing of a separating membrane 12 having vertical corrugations makes it possible to prevent the air or the methanol from reaching directly the opposite electrode in the case of accidental perforation of an electrode.

Therefore, as the fixing agent 3" of the anode is in the form of $CO_3{}^{2-}$, the decarbonatation phase is thus reached. With that aim in view, the compartment 5 is then emptied of its electrolyte 6 which is transferred by means of the suction pump 53 (FIG. 21) either in an auxiliary tank 27 (FIG. 6) or in an element $5^1$ of another cell (FIG. 7) or in another element 5' of the cell (FIGS. 8 and 9).

It will be observed that in such transfer operations, the pump 53 sucks in, through the nozzles 43 and 44 and through the pipes 29, $21_1 \ldots 21_{i+1}$, only air and consequently consumes only a slight power.

With reference more particularly to FIGS. 4 and 5, it will be seen that when the electrolyte compartment 5 is empty, there remains an electrolytic continuity between the electrodes 2 and 3, the membrane 12 remaining saturated with electrolyte and meniscusses 26 being formed at the points of contact between the said membrane of the electrodes.

Therefore, a new electrolytic system having a slight resistance, but through which the diffusion of the OH—, divided by a factor in the order of 50 in relation to the previous state, has become negligible and through which the only contribution of OH— is the contribution by migration which is effected with a low transport number due to the presence of the neutral salt, has been produced. The oxidation of the methanol, which should consume a base, is therefore effected mainly by consuming the $CO_3{=}$ trapped by the fixing agent, that $CO_3{=}$ being "mobilized" by means of the dissolved buffer which acts as a relay between the reaction zones of the anode and the fixing agent: the buffer changes from the base form to the acid form on the reaction zone; that acid then reacts on the trapped $CO_3{=}$ which is transformed into $CO_2$, which is eliminated, whereas the acid form, which has been changed back again by the reaction to the base form, is again available for the same cycle. At that moment, the electrolyte 6 is again brought into its compartment 5 by means of the pump 53 which sucks in such a liquid through the ducts $21 \ldots 21\ i+1$ and the element 1 operates again in the active phase and so on.

It will be observed that when the electrolyte is brought into its compartment, there is a discharge between the $CH_3COO{-}$ ions fixed on the resin and the OH— ions of the electrolyte, the fixing agent 3" neutralized in an insoluble or dissolved form as the case may be by the anion of the neutral salt changing back to the OH— form which is insoluble in all cases.

It will therefore be seen that each element of the cell is alternately in active phase and in decarbonatation phase, the duration of the active phase being preferably in the order of a few tens to a few hundreds of seconds and the decarbonatation phase has a duration in the order of a third or a half of the active phase.

Inasmuch as concerns the regulating of the various phases of the operation of the cell, the latter may be ensured by known devices and serve-control devices which bring into play only a simple electronic circuitry which is not very expensive and consumes only a minimum of electrical energy.

For example, the pump 52 (FIG. 21) for the injection of methanol and the fan 49 may be subjected to the current discharge generated by the cell.

Moreover, the detection of the end of the active phase could be effected by means of a coulometer affecting the pump 53 starting up the decarbonatation phase.

Likewise, the end of the decarbonatation phase will be detected by a carbon dioxide gas pressure gauge arranged in the nozzle 45 (FIG. 20) and affecting the pump 52 starting up another active phase.

A cell using methanol as a fuel and air as a combustibel is described in all the foregoing, but it is quite evident that numerous variants may be provided for without forasmuch going beyond the scope of the invention.

Besides methanol, other fuels may be used, more particularly hydrocarbons and mores especially natural gas.

It is also possible to feed the cell with a non-carbonated fuel such as hydrazine, the decarbonatation phase being, of course, carried out only after longer periods, with a view to removing the carbon dioxide brought in exclusively by the air.

Numerous practical applications are found for the invention, more particularly as an electric battery for non-poluting vehicles.

Although the device which has just been described may appear to afford the greatest advantages for implementing the invention in a particular technical situation, it will be understood that various modifications may be made thereto without going beyond the scope of the invention, it being possible to replace certain of its elements by others capable of fulfilling the same technical function therein.

I claim:

1. Fuel cell having a plurality of elements (1) arranged in electrical contact with one another, each element comprising
    a compartment (5) containing a pervious catalytic cathode electrode (2) and a pervious catalytic anode electrode (3) in spaced relationship to each other on opposed sides of said compartment (5) forming a space therebetween, said anode electrode (3) being a composite anode comprising (i) a catalyst component, and (ii) a fixing agent component for fixing carbonate ions,;
    means for charging an aqueous alkaline electrolyte (6) to fill the space between the electrodes in said compartment (5) and means for discharging said electrolyte from said space during the decarbonation phase;
    a porous separating membrane (12) saturated with said electrolyte located in the space filled by the electrolyte and alternately contacting each of said cathode and said anode in a plurality of positions;
    wherein during operation of said fuel cell a combustive gas contacts the cathode electrode (2) and a gaseous fuel contacts the anode electrode (3), thereby forming water vapor, and generating carbonate ions at the anode electrode which are fixed by said fixing agent; and
    means for converting said carbonate ions to carbon dioxide and means for removing said carbon dioxide when said electrolyte is discharged; and
    condenser exchanger (7) in fluid communication with said compartment (5) for receiving said water vapor, then condensing it to water which is returned to the electrolyte in said compartment (5).

2. Cell according to claim 1, characterized in that the said fixing agent is arranged in the form of a layer (3") on the inside surface of the anode (3).

3. Cell according to claim 1, characterized in that the said fixing agent is closely mixed with the catalyst of the anode (3).

4. Cell according to claim 1 characterized in that the said fixing agent is a highly basic ion exchanging resin.

5. Cell according claim 4, characterized in that the said fixing agent is an insoluble hydroxide which reacts to form an insoluble carbonate.

6. Cell according to claim 5, characterized in that the said hydroxide is calcium hydroxide.

7. Cell according to claim 1, characterized in that the said means suitable for removing the carbonates in the form of carbon dioxide are constituted (i) by an acid buffer in a concentration varying between 0.01 to a few moles per liter dissolved in the aqueous solution constituting the said electrolyte (6), the said acid buffer being able to contact the said fixing agent while removing the carbonates in th form of carbon dioxide and (ii) by a neutral salt for limiting the diffusion of hydroxyl ions formed at the cathode, this being effected by reduction of their transport number.

8. Cell according to claim 7, characterized in that the said buffer is the acetic-acid-acetate system.

9. Cell according to claim 7, characterized in that the said buffer is the boric acid-borate system.

10. Cell according to claim 7, characterized in that the said buffer is the monoacid phosphate-diacid phosphate system.

11. Cell according to claim 7, characterized in that the said neutral salt is an alkaline halide, or sulfate.

12. Cell according to claim 7, characterized in that the said neutral salt is potassium chloride or potassium sulphate.

13. Cell according to claim 1 comprising an element ($1_1$) of another fuel cell to hold electrolyte discharged from said fuel cell.

14. Cell according to claim 1 comprising an adjacent element (1') of the same fuel cell to hold electrolyte discharged from said fuel cell.

15. Cell according to claim 1, characterized in that the catalyst of the cathode (2) is formed by powdered carbon and carbon fibres.

16. Cell according to claim 1, characterized in that the catalyst of the anode (3) comprises powdered carbon and carbon fibres as well as at least one substance of the platinum group.

17. A method of operating a fuel cell having alternating carbonation and decarbonation stages, said fuel cell containing a plurality of elements, each of said elements comprising a compartment containing a pervious composite anode comprising a catalyst and a fixing agent for fixing carbonate ions during the carbonation stage spaced apart from a pervious catalytic cathode which are electrolytically connected (i) by an aqueous alkaline electrolyte during the carbonation stage, and also (ii) by a porous membrane in said electrolyte which alternately contacts said anode and said cathode during both the carbonation and decarbonation stages, said element also containing an agent for fixing carbonate ions in contact with said electrolyte, comprising contacting a combustive gas with said cathode and contacting a gaseous fuel with said anode thereby (a) generating electricity and also forming (b) water vapor which is conducted to a condenser-exchanger in fluid communication with said compartment wherein said water vapor is condensed and is then returned to said compartment, and (c) forming carbonate ions at the anode which then contact said fixing agent and are fixed in contact with said electrolyte until the capacity of the fixing agent is substantially utilized, then removing said electrolyte from said element whereby electrolytic contact between said cathode and said anode is maintained through said porous membrane which is saturated with said electrolyte and continuing to contact said cathode with said combustive gas and said anode with said gaseous fuel so that electricity is generated and the oxidation of the gaseous fuel at the anode causes a reaction with the carbonate ions which are transformed to gaseous carbon dioxide which is removed with the spent gaseous fuel after contact with said anode until substantially all of the carbonate ions which have been fixed are transformed to carbon dioxide, and then returning said electrolyte to said cell and continuing to contact the combustive gas with a cathode and the gaseous fuel with the anode to generate electricity and carbonate ions at the anode.

18. The method of claim 17 wherein said fixing agent is selected from the group consisting of a highly basic ion exchange resin and a hydroxide which reacts to form an insoluble carbonate, and wherein said electrolyte contains a neutral salt and a buffer whereby when said electrolyte is in said element, the system is basic and whereby after said electrolyte is discharged from said element and said method operates to produce electricity and carbon dioxide at said anode, the electrolytic contact between said anode and said cathode comprising said saturated porous membrane becomes acidic.

19. The method of claim 18 wherein said buffer is selected from the group consisting of the acetic acid-acetate system, the boric acid-borate system, and the monoacid phosphate-diacid phosphate system.

20. The method of claim 19 wherein said neutral salt is potassium chloride or potassium sulphate.

21. The method of claim 18 wherein said neutral salt is an alkaline halide or sulphate.

22. The method of claim 17 wherein said combustive gas is air.

23. The method of claim 17 wherein said fuel is methanol.

24. The method of claim 17 wherein said fuel is a hydrocarbon.

25. The method of claim 17 wherein said fuel is natural gas.

26. The method of claim 17 wherein said fuel is hydrazine.

* * * * *